United States Patent
Reeves

[15] 3,679,220
[45] July 25, 1972

[54] QUICK CHANGE TOOL HOLDER
[72] Inventor: Harold C. Reeves, Akron, Ohio
[73] Assignee: Portage Machine Company, Akron, Ohio
[22] Filed: March 23, 1970
[21] Appl. No.: 21,834

[52] U.S. Cl. ............................................. 279/1 B, 279/89
[51] Int. Cl. ........................................... B23b 31/10
[58] Field of Search .................. 279/1 A, 1 B, 1 SG, 1 T, 89, 279/90, 91, 93

[56] References Cited
UNITED STATES PATENTS 3,512,793  5/1970  Botimer ............................. 279/91
3,498,624  3/1970  Hammond et al. ................ 279/89 X
2,960,343  11/1960  Elledge ............................. 279/1 B UX
2,611,621  9/1952  Patterson et al. ................. 279/1 B UX Primary Examiner—Andrew R. Juhasz
Assistant Examiner—James F. Coan
Attorney—Freeman & Taylor

[57] ABSTRACT

In a tool holder adapted to be mounted in a spindle for rotational purposes and to releasably hold a tool adaptor the provision of a spring loaded impact ring movable relatively of the holder and its locking nut, whereby, by grasping the impact ring, the adaptor can be removed without halting the spindle.

5 Claims, 10 Drawing Figures

INVENTOR.
HAROLD C. REEVES
BY Freeman & Taylor
ATTORNEYS 3,679,220

INVENTOR.
HAROLD C. REEVES
BY Freeman & Taylor
ATTORNEYS

QUICK CHANGE TOOL HOLDER

BACKGROUND OF THE INVENTION

This invention relates to tool holding devices and in particular relates to an improved tool holder which is designed to permit quick change of the tool and tool adaptor without halting the machine carrying the same.

It has long been known that chuck-type tool holders can be provided with locking means so that a tool adaptor may be inserted into the same and secured in place, with the holder then being inserted, in turn, into a rotatable spindle or arbor in order to permit the tool carried thereby to be utilized for various machining operations.

However, in most prior devices it is necessary, when the tool is to be changed, to stop the machine, deactivate the locking mechanism; remove the tool and adaptor and then replace the tool and adaptor; relock the same in place and then restart the machine.

This invention relates to a tool holder of this type that is provided with an impact ring which moves relatively of the tool holder and its locking nut to permit a "two-step" unlocking operation without stopping the machine.

DESCRIPTION OF THE PRIOR ART

The following prior art is known to applicant:
Manzel U.S. Pat. No. 931,327; Markstrum U.S. Patent No. 1,766,136, Ross U.S. Patent No. 2,219,907; Fausel U.S. Patent No. 2,686,683; Benjamin U.S. Pat. No. 3,171,666.

All of these patents show means for locking a tool adaptor in a tool holder but none provide the "two-step" unlocking discovered by applicant and described below.

SUMMARY OF THE INVENTION

It has been discovered that by utilization of an improved impact ring that moves relatively of both the tool holder and the normal locking nut thereof that a "two-step" unlocking operation can be performed by hand by grasping the impact ring and holding it against the rotation of the tool, with the improved structure permitting the performance of this operation without the necessity for halting the arbor or spindle.

It has also been found that by providing a spring loaded connection between the impact ring and a reaction ring that merely releasing the impact ring permits the parts to be returned to locked condition with respect to the tool adaptor.

Such an improvement constitutes a considerable saving in time to the machine operator and a consequent improvement in the economy of the machining operation being performed.

Production of an improved quick release tool holder having the above characteristics therefore becomes the principal object of this invention, with other objects thereof becoming more apparent upon a reading of the following brief specification, considered and interpreted in the light of the accompanying drawings.

Figure 2:
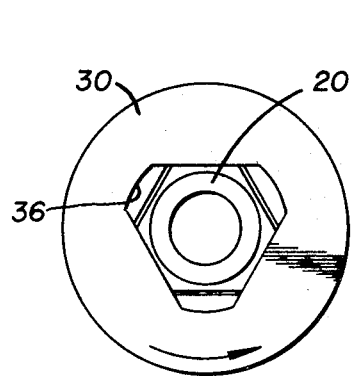
FIGS. 2, 2a and 2b are schematic end views of the assembled holder taken from the right of FIG. 1 and showing the relationship between the locking nut and the tool adaptor at various stages of operation.
Figure 3:
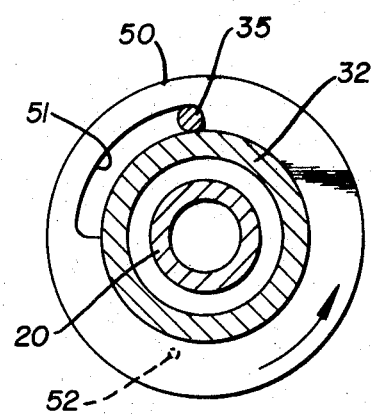
FIGS. 3, 3a and 3b are schematic sectional views taken along the lines 3—3 of FIG. 1 and showing the relationship between the locking nut, tool adaptor and impact ring at various stages of operation.
Figure 4:
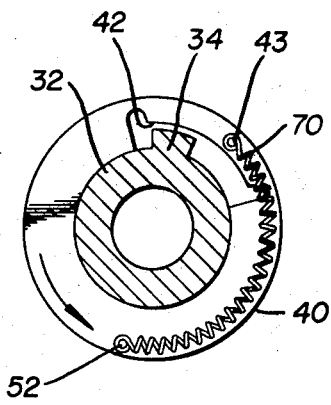
FIGS. 4, 4a and 4b are schematic sectional views taken on lines 4—4 of FIG. 1 showing the relationship between the locking nut, impact ring, spring and reaction ring at various stages of operation.
Figure 2A:
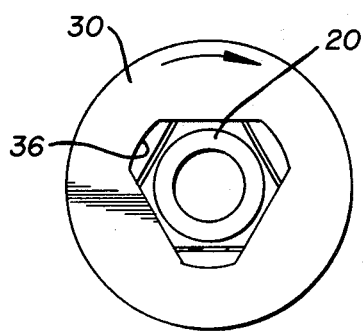
Figure 3A:
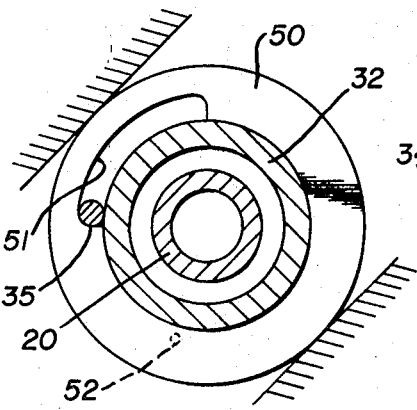
Figure 4A:
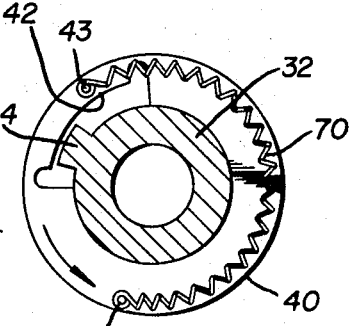
Figure 2B:
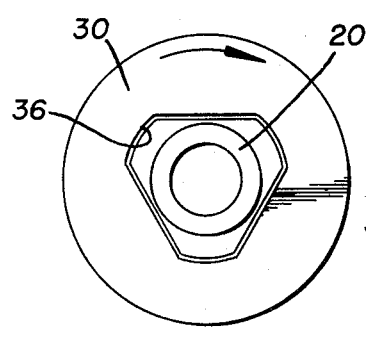
Figure 3B:
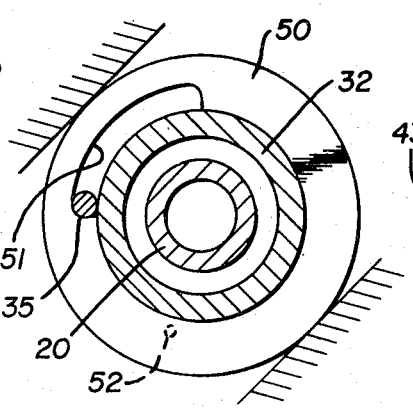
Figure 4B:
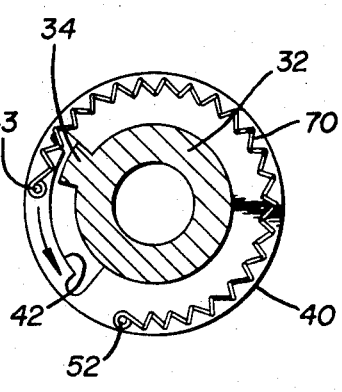

It should first be noted that FIGS. 2, 3 and 4 show the tool in normal running condition while FIGURES 2a, 3a and 4a stopped and FIGURES 2b, 3a and 4b show the various parts of the tool holder in unlocked condition.

Figure 1:
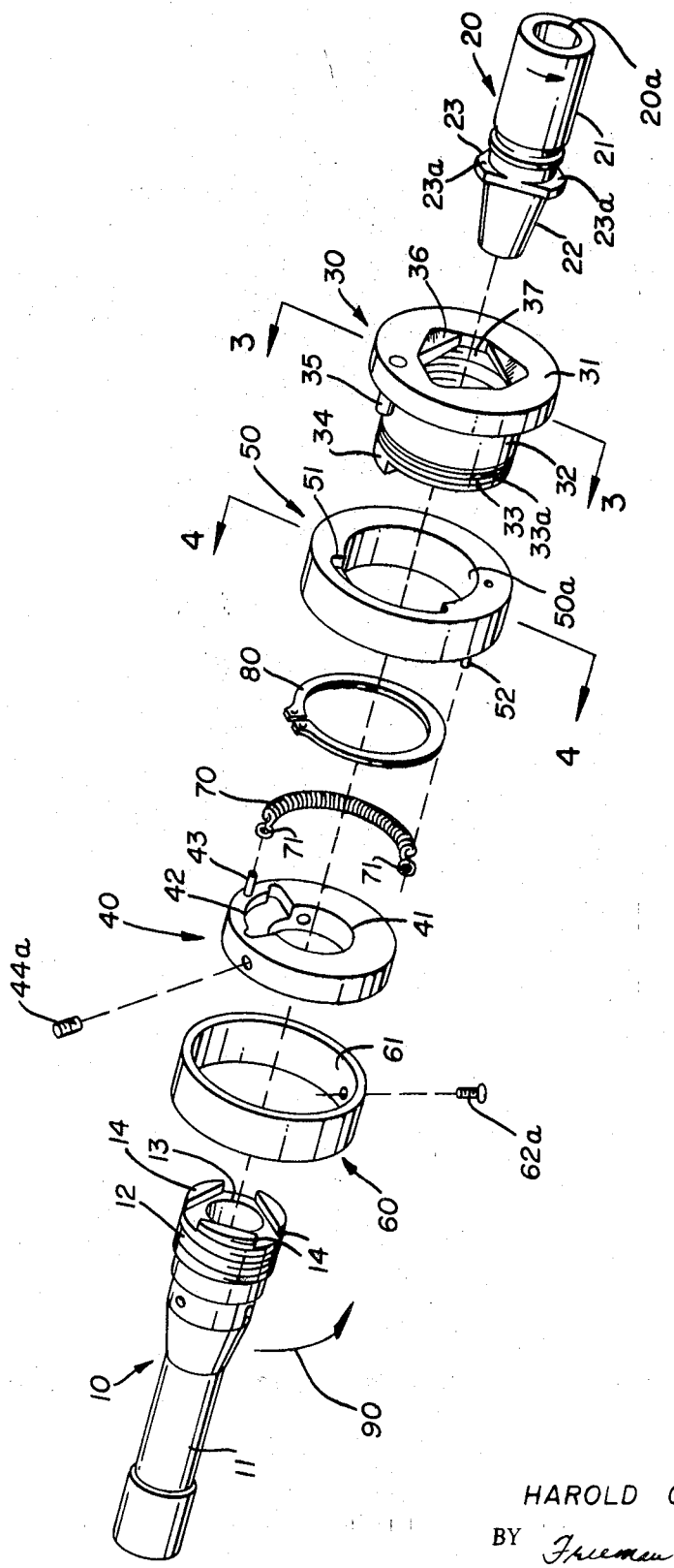
FIG. 1 is an exploded view of the improved quick change tool holder and tool adaptor.

Referring first then to FIG. 1 of the drawings for a general description of the device, it will be seen that the improved tool holder generally includes a holder body 10, a tool adaptor 20, a locking nut 30, reaction ring 40 and impact ring 50, as well as a cover ring 60.

Considering again FIG. 1 for a more detailed description of the parts and their interaction with each other, attention is first directed to the holder body 10 which has an elongate cylindrical body portion 11 which is designed to fit into a standard arbor or spindle ( not shown) so that the same may be rotated in the direction of arrow 90 in conventional fashion.

The holder body 10 also has a forward threaded end 12 with a tapered bore 13 therein, with the threaded end 12 having three projecting lugs 14, 14, 14 generally arranged in a triangular pattern when viewed from the forward end of the body 10.

The tool adaptor 20 has a generally cylindrical forward portion 21, with a through bore 20a therein for reception of an appropriate tool. The adaptor also has a tapering rear end 22, which is tapered complementally with the tapered internal bore 13 of the holder body 10 for reception therein as will be described more fully below.

Between forward end 21 and rear end 22 of the adaptor 20 is a triangular shaped flange 23, with appropriate identical projections 23a, 23a. This flange is of a size which permits its reception between the lugs 14, 14, 14 of the holder body 10 when the rear end 22 of the adaptor is inserted into the bore 13 of the body. In this way, any rotational movement imparted to the body 10 by the arbor will likewise be imparted to the adaptor 20.

Turning next then to the locking nut 30, which engages adaptor 20, it will be seen that the same has an enlarged head 31, a generally cylindrical rear portion 32 and a through threaded bore 37 which can be threaded on end 12 of holder 10. The head 31 has an undercut triangular opening 36 which is generally contoured so as to permit reception of the flange 23 of the adaptor 20 through opening 26 into the bore 37. By turning the adaptor 20 so that the projections 23a, 23a thereof are mismatched with the opening 36 of lock nut 30, axial separation of the two is prohibited.

The head 31 of lock nut 30 also carries a rearwardly projecting pin 35 whose function will be explained more fully below in connection with impact ring 50. Also, the cylindrical portion 32 of the lock nut 30 has a circumferential grooves 33 and 33a on its outer periphery and has left-hand threads 37 on its inside surface as noted above. These threads 37 mate with the threads 12 of the holder body 10 so that the lock nut can be secured to the body 10 for rotation therewith. The rear end of cylindrical body portion 32 of the lock nut also has a projecting lug 34 and the purpose of this will also be explained more fully below.

Turning next then to release or impact ring 50 it should be noted that the same has a through bore 50a therein which is of sufficient internal diameter to be slipped over cylindrical portion 32 of locking nut 30. This release ring also has an arcuate cut-out area 51 in one face, and the pin 35 of locking nut 30 fits into this arcuate area 51 after the ring 50 is slipped on the nut 30. The pin 35 and cut-out area 51 will thus limit rotation of the impact ring 50 about the body 32 of the lock nut 30.

The impact ring 50 is further retained in place on the body 32 of the lock nut 30 by snap ring 80, which rides in groove 33a of nut 30.

Considering next then reaction ring 40 the same fits over the front end 12 of the holder body 10, and this ring also has an arcuate cut-out area 42 in one face and forwardly projecting pin 43. Lug 34 of the lock nut 30 engages the arcuate cut-out 42 so as to limit rotation of the lock nut 30 in the tool body 10, with the reaction ring 40 itself being secured to the body 10 by means of set screws 44a, 44a.

The spring member member 70 is disposed between reaction ring 40 and impact ring 50 with one end 71 attached to pin 43 of the reaction ring 40 and the other end 71 attached to the pin 52 of impact ring 50. This spring 70 also rides in the groove 33 of the lock nut 30. Once the device has been assembled to this point, the cover ring 60 slips over reaction ring 40 and rests against the rear face of the impact ring 50, thus covering the spring mechanism 70 and being secured in place by screw 62a.

Once the tool holder has been assembled in the manner described, with the holder body 10 being received in the arbor or spindle (not shown) of a conventional machine tool and the remaining parts telescoped on end 12 thereof, the tool can be operated in normal fashion with the various parts being in the positions shown in FIGS. 2, 3 and 4 and with the tool rotating in the direction of arrow 90.

When it is desired to replace the tool adaptor 20, it is merely necessary to grasp impact ring 50 and either hold it against the rotation of the tool or rotate the same in an opposite direction from the direction of rotation of the tool. In this fashion, the pin 35 will move in arcuate slot 51 of the impact ring 50 to the position of FIG. 3a with pin 35 abutting the end of arcuate slot 51. At this time projection 34 will be at about the midpoint of slot 42 and flange 23 of tool adaptor 20 still being retained in place by the head of locking nut 30.

When the pin 35 reaches the bottom of the arcuate slot 51, the lug 34 of the lock nut 30 will then be moved, by further rotation of the tool, into contact with the end of slot 42 of reaction ring 40. This will cause a slight loosening or unscrewing of the lock nut 30 so that the flange 23 of the adaptor 20 will be brought into alignment with notches of opening 36 of the nut 30 and, at this point, the adaptor 20 can merely be removed axially by pulling it out of the opening.

Once a new adaptor has been inserted, it is merely necessary to release the impact ring 50 and the force of the spring 70 will return the parts to their previous position so that the head 31 of the lock nut overlies the flange 23 of the adaptor, and at this point the device is ready for further operation.

It is believed apparent from the foregoing that a very quick change of tools can be made with a minimum of effort and also without stopping the machine. In effect, a "two-step" unlocking procedure is provided by the coaction between pin 35 and slot 51, and lug 34 and slot 42.

In this fashion a quick and easy change of tools can be made by hand without the need for any tools.

Also, due to spring 70, the parts are automatically returned to their operative positions upon insertion of a new tool and release of ring 50.

While a full and complete description of the invention has been set forth in accordance with the dictates of the patent statutes it is to be understood that modifications thereof can be made without departing from the spirit thereof or the scope of the appended claims.

What is claimed is:

1. A tool holder adapted to receive a flanged tool adaptor of the character described, comprising;
   A. a holder body
   B. a locking member
      1. releasably mounted on said body
      2. and overlying said flange and releasably retaining said tool adaptor on said tool holder
   C. release means
      1. mounted on said body
      2. and adapted to rotate said locking member into and out of locking relationship with said tool adaptor; and
   D. means carried by said release means and adapted to normally urge said locking member into locked condition.

2. The device of claim 1 further characterized by the fact that said release means include an impact ring and a reaction ring.

3. The device of claim 2 further characterized by the fact that said means for urging said locking member into locking condition include a spring interconnecting said impact and reaction rings.

4. The device of claim 1 further characterized by means for interconnecting said locking means and said release means for selective movement in unison and relatively of each other.

5. The device of claim 2 further characterized by the presence of:
   A. first and second projections on said locking member;
   B. said impact ring having an arcuate cut-out area for reception of said first projection; and
   C. said reaction member having an arcuate cut-out area for reception of said second projection.

* * * * *